(12) United States Patent
Schiefer et al.

(10) Patent No.: US 7,113,955 B2
(45) Date of Patent: Sep. 26, 2006

(54) EFFICIENT DETERMINATION OF HOMOGENEOUS RECTANGLES IN A BINARY MATRIX

(75) Inventors: Bernhard K. Schiefer, Pickering (CA); Jarek Gryz, Toronto (CA); Jeff Edmonds, Toronto (CA); Renee J. Miller, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1315 days.

(21) Appl. No.: 09/793,048

(22) Filed: Feb. 26, 2001

(65) Prior Publication Data

US 2005/0278367 A1   Dec. 15, 2005

(30) Foreign Application Priority Data

Feb. 25, 2000   (CA) .................................... 2299553

(51) Int. Cl.
*G06F 17/00*   (2006.01)

(52) U.S. Cl. ............... 707/102; 707/2; 707/3; 707/101

(58) Field of Classification Search ..................... None
See application file for complete search history.

(56) References Cited

U.S. PATENT DOCUMENTS

| | | | | |
|---|---|---|---|---|
| 6,110,707 | A * | 8/2000 | Newgard et al. | 435/69.4 |
| 6,134,540 | A * | 10/2000 | Carey et al. | 707/2 |
| 6,377,261 | B1 * | 4/2002 | Fernandez et al. | 345/467 |
| 6,416,714 | B1 * | 7/2002 | Nova et al. | 422/68.1 |
| 6,480,836 | B1 * | 11/2002 | Colby et al. | 707/3 |
| 6,493,699 | B1 * | 12/2002 | Colby et al. | 707/2 |
| 6,519,604 | B1 * | 2/2003 | Acharya et al. | 707/102 |
| 6,610,482 | B1 * | 8/2003 | Fodor et al. | 435/6 |

* cited by examiner

*Primary Examiner*—Sana Al-Hashemi
(74) *Attorney, Agent, or Firm*—Whitham, Curtis, Christofferson & Cook, PC; Stephen C. Kaufman (57) ABSTRACT

Determining maximal empty rectangles in a binary matrix includes building values in a staircase data structure for each successive entry in the matrix. The values in the staircase data structure are removed where the values correspond to maximal rectangles having the successive entry in the bottom right corner of the rectangle. The values in the staircase data structure for each successive entry being determinable from values in the staircase data structure for a preceding entry in the matrix. The maximal empty rectangles providing a basis for generating efficient relational join operations on defined relational tables.

10 Claims, 3 Drawing Sheets

EFFICIENT DETERMINATION OF HOMOGENEOUS RECTANGLES IN A BINARY MATRIX

FIELD OF TIME INVENTION

The present invention is directed to an improvement in computing systems and in particular to computing systems which provide for the efficient determination of homogeneous rectangles in a binary matrix.

BACKGROUND OF THE INVENTION

In data processing it is advantageous to determine relationships between data values in large data sets. Such approaches to characterizing data values include clustering or classification in which different techniques are used to group and characterize the data (as set out, for example, in M. Ester, H.-P. Kriegel, and X. Xu. A Database Interface for Clustering in Large Spatial Databases. In *Proc. of the Int'l Conf. on Knowledge Discovery & Data Mining*, 1995, T. Zhang, R. Ramakrishnan, and M. Livny. BIRCH: An Efficient Data Clustering Method for Very Large Databases. In *ACM SIGMOD Int'l Conf on the Management of Data*, Montreal, Canada, 1996, and M. Mehta, R. Agrawal and J. Rissanen. SLIQ: A Fast Scalable Classifier for Data Mining. In *Advances in Database Technology—Int'l Conf. on Extending Database Technology (EDBT)*, Avignon, France, March 1996). Such techniques permit the development of a more "parsimonious" version of the data (as described in H. V. Jagadish, J. Madar, and R. T. Ng. Semantic Compression and Pattern Extraction with Fascicles. In *Proc. of the Int'l Conf. on Very Large Data Bases (VLDB)*, pages 186–197, 1999). Data may be compressed and data may he analyzed to reveal hidden patterns and trends in the data (data mining). Association rules and fascicles are used in the prior art to determine characteristics of a data set.

The data patterns discovered by the prior art data mining techniques are defined by a measure of similarity (data values must be identical or similar to appear together in a pattern) and some measure of degree of frequency or occurrence (a pattern is only interesting if a sufficient number of values manifest the pattern).

Where a data set has two attributes that are of interest, and the attribute values are discrete, a discrete binary matrix may be created to represent the data values in the data set with respect to those attributes. Where such a discrete binary matrix is defined, characteristics of the data may be analyzed by determining which portions of the matrix contain rectangles of homogenous values. Typically the verse being determined are zero values in the binary matrix and the rectangles being determined or discovered are termed empty rectangles.

Prior art approaches to determining empty rectangles include finding or determining the location of a set of maximal empty rectangles in a binary matrix (see for example A. Namaad, W. L. Hsu, and D. T. Lee. On the maxim empty rectangle problem. *Applied Discrete Mathematics*, (8):267–277, 1984, M. J. Atallah and Fredrickson G. N. A note on finding a maximum empty rectangle. *Discrete Applied Mathematics*, (13):87–91, 1986, Bernard Chazelle, Robert L. (Scot) Drysdale III, and D. T. Lee. Computing the largest empty rectangle. *SIAM J. Comput.*, 15(1):550–555, 1986, and M. Orlowshi. A New Algorithm for the Largest Empty Rectangle Problem. *Algorith-mica*, 5(1):65–73, 1990).

In the prior art approaches the method for determining the maximal empty rectangles in a binary max requires continual access and modification of a data structure that is as large as the original matrix itself. This approach does not scale well for large data sets due to the memory requirements inherent in the approach.

Another prior art approach (referred to in Orlowshi, above) considers points in a real plane instead of discrete elements or entities in a binary matrix. In this method, an assumption is made that points have distinct x and y coordinates and so the approach does not disclose determining empty rectangles where there are multiple values possible in the data set being considered.

A common application for the characterization of similarity of data values in large data sets is for relational databases. In particular, a useful application of this data mining approach is for implementation of the relational join operation for large data sets. Because the calculation of a join over large relational tables is potentially expensive in time and memory, the characterization of data in the relational tables is desirable to achieve efficiencies in the implementation of a join over such data tables.

It is therefore desirable to have a computer system for the determination of maximal homogenous rectangles in a binary matrix which is able to be carried out with efficient use of memory and disk access and which facilitates the efficient implementation of the relational join over large relational data tables.

SUMMARY OF THE INVENTION

According to one aspect of the present invention, there is provided an improved system for the efficient determination of maximal homogeneous target-value rectangles in a binary matrix. According to another aspect of the present invention, there is provided a method for determining maximal homogeneous target-value rectangles for a binary mix, the method including the steps of sequentially selecting each entry (x, y) from row y and column x in the matrix, the sequence for selection being ordered first by lowest row to highest row, and within each row from lowest column to highest column, for each selected entry (x, y), determining the entries in a staircase (x, y) data structure, the staircase (x, y) data structure being maintained as a stack and comprising entries corresponding to entries in the matrix, each entry in the staircase (x, y) data structure corresponding to a step in a staircase-shaped region of the matrix having target-value entries only, the staircase-shaped region having a one of its boundaries defined by column x and having another one of its boundaries defined by row y, extracting maximal rectangles for entry (x, y) by removing from the staircase (x, y) data structure, and storing as part of a set of maximal homogeneous rectangles for the matrix, each entry in the staircase (x, y) data structure corresponding to a maximal rectangle of target-values, where the said rectangle is characterized by its corner with the highest x column value and highest y row value being entry (x, y).

According to another aspect of the present invention, there is provided the above method in which the step of extracting maximal rectangles includes the following steps:

a) determining a value $x_*$ for the entry $(x, y)$,
   the value $x_*$ being defined to be the column at the low X-value end of a block of target-value entries in row y+1 commencing at entry $(x, y+1)$, the value $x_*$ being defined to be an arbitrarily high value greater than x, where there is no such block of target-value entries,
b) determining a value $y_*$ for the entry $(x, y)$,
   the value $y_*$ being defined to be the row at the low Y-value end of a block of target-value entries in column x+1, commencing at entry $(x+1, y)$, the value $y_*$ being defined to be an arbitrarily high value greater than y, where there is no such block of target-value entries,
c) extracting as maximal rectangles those entries $(x_i, y_i)$ in staircase $(x, y)$ for which both $x_i < x_*$ and $y_i < y_*$.

According to another aspect of the present invention, there is provided the above method in which the stop of determining the entries in a staircase $(x, y)$ data structure comprises the step of determining the said entries by utilizing be entries in a staircase $(x-1, y)$ data structure, following the extraction of maximal rectangle entries from the staircase $(x-1, y)$ data structure.

According to another aspect of the present invention, there is provided the above method in which the steps of determining a value $x_*$ and a value $y_*$ for an entry $(x, y)$ comprise the steps of accessing stored values for a value $x_*$ and a value $y_*$ for the selected entry $(x-1, y)$ and accessing values for entries $(x, y+1)$ and $(x+1, y)$ to determine the values for $x_*$ and $y_*$ for the entry $(x, y)$.

According to another aspect of the present invention, there is provided a program storage device readable by a machine, tangibly embodying a program of instructions executable by the machine to perform the above method steps.

According to another aspect of the present invention, there is provided a computer system for determining maximal homogeneous target-value rectangles for a binary matrix,
   the system outputting maximal rectangles for each entry $(x, y)$ in the matrix, the entries being considered in row order from smallest to largest and in column order from smallest to largest within each row,
   the system reading row y+1 from the binary matrix before determining the maximal rectangles for the entry $(x, y)$,
   the system maintaining a staircase data structure for storing staircase and modified staircase values for entries in the matrix,
   the system storing a defined $x_*$ value for each row and storing a defined $y_*$ value for each entry in a row,
   the system comprising,
      i) means far determining, in the staircase data struck a set of staircase values for the entry $(x, y)$ in the staircase data structure, the means comprising
         (a) means for setting staircase values in the stairs data structure to null if the entry $(x, y)$ is not a target-value entry,
         (b) means for building the staircase data structure if the entry $(x, y)$ is a target-value entry, comprising, means for defining a value $x_*$ and a value $y_*$ for entry $(x, y)$ where the value $x_*$ is defined to be the column at the low X-value end of a block of 0-entries in row y+1 commencing at entry $(x, y+1)$, the value $x_*$ being defined to be an arbitrarily high value greater than x, where there is no such block of target-value entries, and the value $y_*$ is defined to be the row at the low Y-value end of a block of 0-entries in column x+1, commencing at entry $(x+1, y)$, the value $y_*$ being defined to be an arbitrarily high value greater than y, where there is no such block of target-value entries and
         means for defining the staircase values for entry $(x, y)$ by adding a new step to a defined set of modified staircase values for an entry $(x-1, y)$, the new step having the value pair $x_n$, and $y_r$,
            where if entry $(x+1, y)$ is a 0-entry then $y_r$ is defined to be the stored $y_*$ value for the entry $(x-1, y)$ and otherwise $y_r$ is defined to be an infinite value,
            and where $x_n$ is defined by comparing $y_r$ to the Y-value of the highest step of staircase values for entry $(x-1, y)$,
      ii) means for retrieving maximal rectangles for entry $(x, y)$ from a non-null set of staircase values for entry $(x, y)$ by removing all steps from the staircase data structure for the staircase values for entry $(x, y)$ where the y value of the step is less than the $y_*$ value for entry $(x, y)$ and the x value of the step is less than the $x_*$ value for entry $(x, y)$,
      iii) means for defining the remaining staircase values for the entry $(x, y)$ in the staircase data structure to be the defined set of modified staircase values for the entry $(x, y)$, and
   b) means for updating the stored value for $x_*$ for row y, and means for updating the stored value for $y_*$ for each of the entries in row y.

According to another aspect of the present invention, there is provided a program storage device readable by a machine, tangibly embodying a program of instructions executable by the machine to perform the functions of the above computer system.

According to another aspect of the present invention, there is provided a method for defining efficient relational join operations on a first relational table and a second relational table, the method including the steps of
   a) carrying out a first join on the first relational table and the second relational table, relative to a first attribute in the first table and a second attribute in the second table,
   b) defining a binary matrix representing the result of the first join, the matrix having rows corresponding to the first attribute data space and columns corresponding to the second attribute data space, an entry $(x, y)$ in the matrix being defined to be empty where there is no tuple with values x and y, where x and y refer to the values of the two attributes, respectively, in the join of the first table and the second table,
   c) mining the binary matrix to define maximal empty rectangles,
   d) using the mined maximal empty rectangles to optimize later queries on the join of the first table and the second table where the query predicates are dependent on the first attribute and the second attribute.

According to another aspect of the present invention, there is provided the above method in which the step of mining the binary matrix to define empty rectangles comprises the steps of the above methods for determining maximal homogeneous rectangles.

According to another aspect of the present invention, there is provided the above method including the further step of representing a selected sub-set of the mined maximal empty rectangles as materialized empty views and optimizing later queries by reducing ranges of attributes in the query predicates, based on the materialized empty views.

According to another aspect of the present invention, there is provided a program storage device readable by a machine, tangibly embodying a program of instructions executable by the machine to perform the above method steps for defining efficient relational join operations.

Advantages of the present invention include a method and system for determining maximal heterogeneous rectangles in a binary matrix that require significantly less memory than the size of the matrix itself, and which may be used to provide optimization of relational operations on large data sets.

BRIEF DESCRIPTION OF THE DRAWINGS

The preferred embodiment of the invention is shown in the drawings, wherein.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 1A:
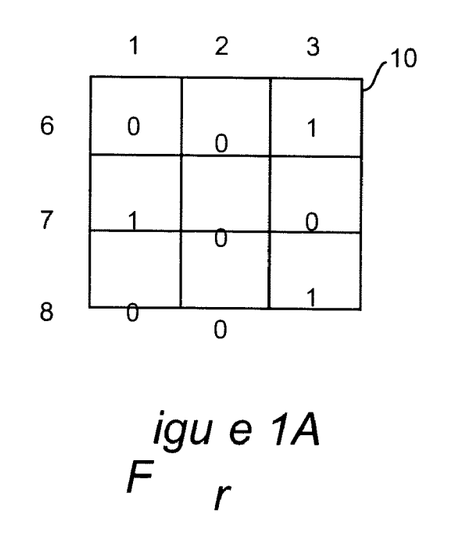
FIG. 1 is a block diagram showing an example binary matrix and empty rectangles which may be determined according to the preferred embodiment of the invention.

FIG. 1 is a block diagram showing an example discrete binary matrix 10 for a data set D having a set of tuples ($v_x$, $v_y$) over two totally ordered domains. Where X and Y denote the set of distinct values in the data set in each of the dimensions, in the example of FIG. 1, X is an attribute with domain (1,2,3) and Y is an attribute with domain (6,7,8). FIG. 1 shows an example where there are only three tuples in the data (x, y)=(3,6), (1,7), (3,8). Matrix 10 (called matrix M in this example) for the data set is shown in FIG. 1a. There is a 1 in position (x, y) of matrix 10 if and only if ($v_x$, $v_y$) is in the data set D where $v_x$ is the $x^{th}$ smallest value in X and $v_y$ the $y^{th}$ smallest in Y. Matrix 10 is defined to have X-values increasing from left to right and Y-values increasing from top to bottom.

Figure 1B:
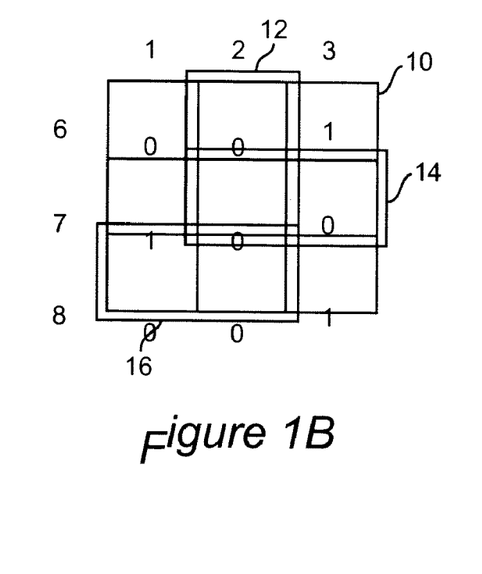
Figure 1C:
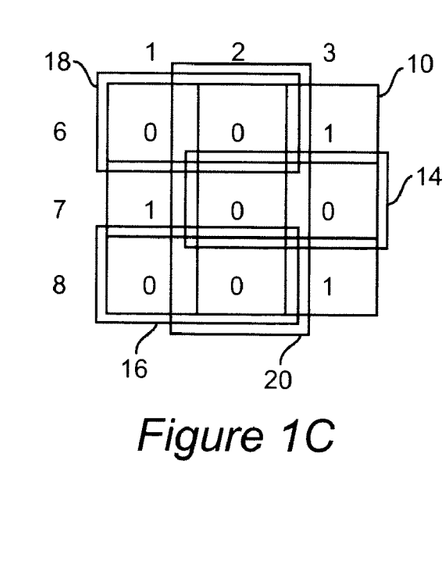

FIG. 1b depicts selected maximal and non-maximal empty rectangles, while FIG. 1c shows all maximal empty rectangles for matrix 10. An empty rectangle is maximal if it cannot be extended along either the X or Y axis because there is at least one 1-entry lying on each of the borders of the rectangle. FIG. 1b shows non-maximal rectangle 12, which can be extended downwards. FIG. 1b also shows maximal rectangles 14, 16. FIG. 1c shows maximal rectangles 14, 16, 18, 20.

According to the preferred embodiment there is a determination of the set of maximal empty rectangles for a given binary matrix M such as that shown as matrix 10 in FIG. 1. Although the preferred embodiment is described in terms of determining empty rectangles, it will be apparent to those skilled in the art that the preferred embodiment will apply to determining maximal rectangles of homogeneous target values in a defined matrix. The target value in the example of the preferred embodiment is the value 0 and hence the rectangles being determined in the matrix are referred to in this description of the preferred embodiment as empty rectangles.

Although the examples presented in the description of the preferred embodiment are for small sets of data, it will be understood by those skilled in the art that the preferred embodiment is particularly suited for processing large matrices which are stored on, or represent data stored on, computer disk and which impose significant resource requirements on a computer system if they are capable of being transferred to random access memory in the computer system.

According to the system of the preferred embodiment, each 0-value entry (x, y) of M is considered one at a time, row by row. The approach of the preferred embodiment does not require, however, all entries of M to be read into computer memory simultaneously. The approach of the preferred embodiment is to define the set of distinct values in the (smaller) dimension to be the X set of values. The preferred embodiment will be most efficient where data which is twice the size of the X set of values is small enough to store in memory (as is described below, effectively two sets of data points are stored at any one time, both sets being the same as the size of X).

According to the system of the preferred embodiment, the data set D is stored on disk and is sorted with respect to the Y domain. The system of the preferred embodiment reads tuples from D sequentially from the disk in this sorted order. When a next tuple ($v_x$, $v_y$) in the data set D is read from disk (a matrix entry with value 1), it is possible to deduce the block of 0-elements in the row before this 1-element.

When considering the 0-value entry (x, y), the preferred embodiment will determine the values of the matrix entries (x+1, y) and (x, y+1). This is handled by having the preferred embodiment's single pass through the data set actually occur one row in advance. This extra row of the matrix is small enough to be stored in memory. Similarly, when considering the 0-element (x, y), the preferred embodiment refers to data values from parts of the matrix already read. To avoid re-reading the data set, all such information is retained in memory, as is described in more detail below.

The preferred embodiment method of determining the set of maximal empty rectangles has the following high-level description, where there are n values in Y and m values in X:

loop y=1 . . . n
loop x=1 . . . m
    Output all maximal 0-rectangles with (x, y) as the bottom-right corner.

The system that implements the method of the preferred embodiment uses a maximal staircase data structure. A staircase (x, y) is defined to be a data structure that stores the she of the maximal staircase-shaped block of 0-entries starting at entry (x, y) in the matrix and extending up and to the left in the matrix as far as possible. In the preferred embodiment, the staircase data structure is defined to be a stack.

Figure 2:
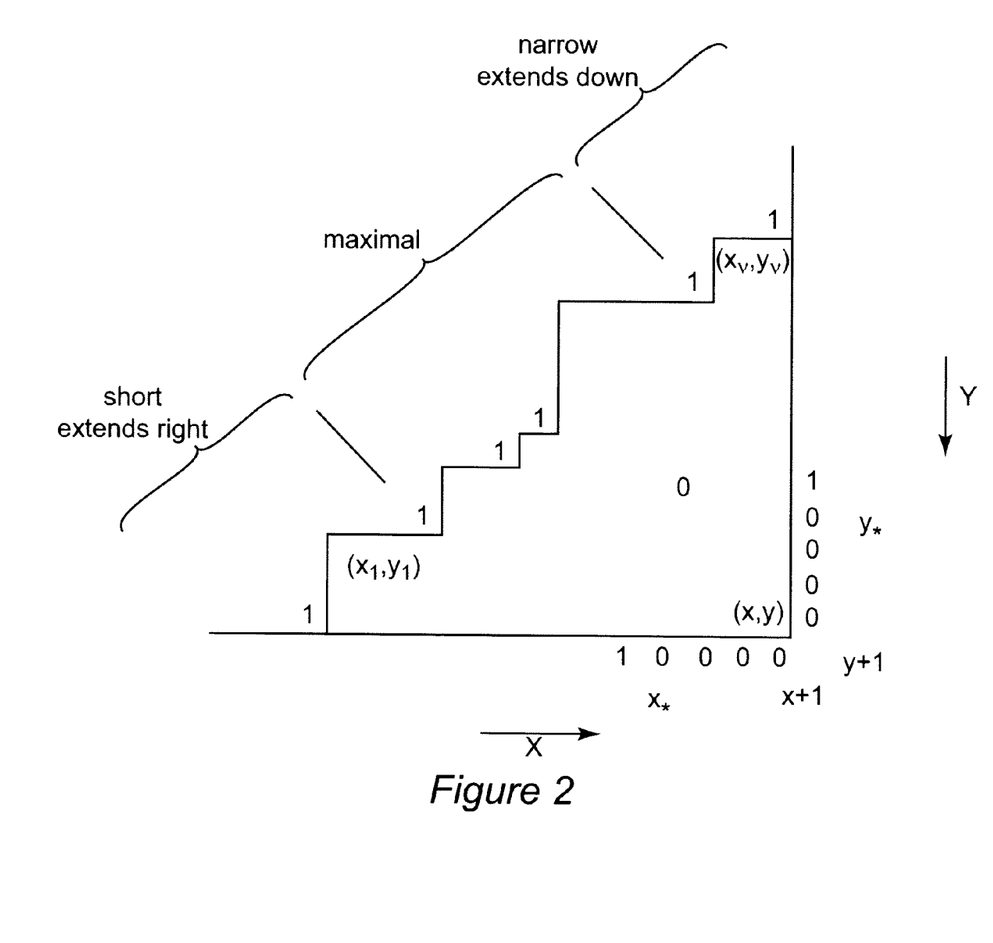
FIG. 2 is a schematic representation of a portion of an example binary matrix showing a staircase-shaped block of 0-entries determined by the preferred embodiment of the invention.

FIG. 2 is a schematic representation of a portion of a binary matrix showing a maximal staircase-shaped block of 0-entries starting at entry (x, y). As may be seen from FIG. 2, the maximal staircase-shaped block extends up and to the left as much as possible. Note that the bottom-right entry separating two steps is a 1-entry. This entry prevents the two adjoining steps from extending up or to the left and prevents another step forming between them.

Each step of the staircase consists of a rectangle $(x_i, x, y_i, y)$ of 0-entries that is up-left maximal in that it cannot be extended either up or to the left to be a larger 0-rectangle because there is at least one 1-entry along its top edge and another along its left edge. Such a step will define a maximal 0-rectangle with (x, y) as the bottom-right corner if and only if there is at least one 1-entry along its bottom edge (row y+1) and another along its right edge (column x+1) preventing it from extending either down or to the right.

Using the notion of the maximal staircase data structure, the above high-level description of the method of the preferred embodiment is expressed as follows:

loop y=1 . . . n
loop x=1 . . . m
Construct staircase (x, y) from staircase (x−1, y)
Output all steps of staircase (x, y) that cannot be extended down or to the right.

The maximal staircase, staircase (x, y), is specified by the coordinates of the top-left corner $(x_i, y_i)$ of each of its steps. In the system of the preferred embodiment, the sequence of steps $(x_1, y_1) \ldots (x_r, y_r)$ is stored in a stack, with the top set $(x_r, y_r)$ on the top of the stack. The example entry $(x_1, y_1)$ and the topmost stack entry $(x_r, y_r)$ are shown in as the defining points for the bottommost and topmost steps in the maximal staircase-shaped block of 0s in FIG. 2.

The maximal staircase, staircase $(x, y)=(x_1, y_1), \ldots, (x_r, y_r)$, is easily constructed from staircase $(x-1, y)=(x_1', y_1'), \ldots, (x_{r'}', y_{r'}')$ as follows:

1. The value of $y_r$ is determined by determining the Y-coordinate for the highest entry in staircase (x, y).
2. If the (x, y) entry itself is a 1, then staircase (x, y) is empty.
3. Otherwise, continue moving up through column x from (x, y) as long as the entry contains a 0. $y_r$ is the Y-coordinate of the last 0-entry in column x above (x, y) before the first 1-entry is found.
4. How the rest of staircase (x, y) is constructed depends on how the new height of top step $y_r$ compares with the old one $y_{r'}'$.
   a. IF $y_r < y_{r'}'$ THEN the new top step is higher then the old top step, and therefore the new stair staircase (x, y), is the sane as the old staircase (x−1, y) except one extra high step is added an the right. This step will have width of only one column and its top-left corner will be $(x, y_r)$. In this case, staircase (x, y) is constructed from staircase (x−1, y) simply by pushing this new step $(x, y_r)$ onto the top of the stack.
   b. IF $y_r = y_{r'}'$ THEN the new top step has the exact same height as the old top step and the new staircase, staircase (x, y), is the same as the old staircase (x−1, y) except that this top step is extended one column to the right. Because the data structure staircase (x, y) stores only the top-left corners of each step, no changes to the maximal staircase data structure are required.
   c. IF $y_r > y_{r'}'$ THEN the new top step is lower then the old top step, and therefore all the old steps that are higher then this new highest step must be deleted. The last deleted step is replaced with the new highest step. The new highest step will have top edge at $y_r$ and will extend to the left as far as the last step $(x_i', y_i')$, to be deleted. Hence, the top-left corner of this new top step will be at location $(x_i', y_r)$. In this case, staircase (x, y) is constructed from staircase (x−1, y) simply by popping off the stack the steps $(x_{r'}', y_{r'}'), (x_{r'-1}', y_{r'-1}') \ldots (x_i', y_i')$, as long as $y_r > y_i'$. Finally, the new top step $(x_i', Y_r)$ is pushed on top.

As may be seen from the above description, when constructing staircase (x, y) from staircase (x−1, y), at most one new step is created.

The goal of the main loop is to output all maximal 0-rectangles with (x, y) as the bottom-right corner. The maximal staircase-shaped block of 0s for the entry (x, y) in the mat is used by the preferred embodiment to determine which empty rectangles that are defined by the (x, y) entry and the maximal staircase-shaped block are, in fact, maximal. In other words, the rectangles defined by steps of staircase (x, y) that cannot be so extended are maximal.

Whether such a rectangle (defined by a step in the max staircase (x, y) and the entry (x, y) itself) can be extended depends on the locations of 1-entries in row y+1 and in column x+1. This may be seen by considering the largest block of 0-entries in row y+1 stating at entry (x, y+1) and extending to the left (taking successively lower values of x in row y+1). Let $x_*$, be the X-coordinate of this leftmost 0-entry in the block of 0-entries beginning at (x, y+1). Similarly, consider the largest block of 0-entries in column x+1 starting at entry (x+1, y) and extending up (successively lower values of y in column x+1). Let $y_*$ be the Y-coordinate of this top most 0-entry in the block of 0-entries.

Now consider a step in staircase (x, y) with top-left corner $(x_i, y_i)$ and therefore forming rectangle $(x_i, x, y_i, y)$. If $x_i \geq x_*$, then this rectangle is sufficiently narrow to be extended down into the block of 0-entries in row y+1. Such a rectangle is not maximal as there is a potential additional row of 0-value entries which can be added to the bottom of the rectangle. An example of such a rectangle is defined by the highest step in FIG. 2.

On the other hand, if $x_i < x_*$, then this rectangle cannot be extended down because it is blocked by the 1-entry located at $(x_*-1, y+1)$. Such a rectangle is potentially maximal in that it cannot have a further row added at its top edge (as the staircase is defined to have a top edge which is bounded by a 1-value entry) and it cannot have a further row added at its bottom edge, due to the presence of the 1-entry located at $(x_*-1, y+1)$.

Similarly, considering the width of the rectangle, the rectangle is sufficiently short to be extended to the right into the block of 0-entries in column x−1 only if $y_i \geq y_*$. See, for example, the rectangle defined by the lowest step in FIG. 2. On the other hand, where $y_i > y_*$, the rectangle will not be able to be extended by adding a row to the right side of the rectangle.

Hence, the rectangle corresponding to step $(x_i, y_i)$ in the staircase data structure is maximal if and only if $x_i < x_*$ and $y_i < y_*$.

Because the preferred embodiment uses a stack to implement the staircase data structure, to output the steps hat are maximal 0-rectangles, the preferred embodiment pops the steps from the stack $(x_r, y_r), (x_{r-1}, y_{r-1}), \ldots$ in turn. As a result of how the staircase data structure has been built (moving from top to bottom and left to right in the matrix), as the steps are popped from the stack, the $x_i$ values become progressively smaller and the $y_i$ values become progressively larger. By comparing the entries in the staircase data structure which define steps with the values $x_*$ and $y_*$, the steps can be divided into three intervals. For a given staircase, there may be steps $(x_i, y_i)$ which have the property $x_i \geq x_*$. For the reason set out above, these steps do not define maximal empty rectangles. For a given staircase data structure there may be an interval of steps $(x_i, y_i)$ for which $x_i < x_*$ and $y_i < y_*$. These steps define empty rectangles that are maximal. For these steps the rectangle $(x_i, x, y_i, y)$ is output to a data structure maintained by the system of the preferred embodiment to define the set of maximal empty rectangles for the matrix.

For steps $(x_i, y_i)$ in the staircase where $y_i$ has a value such that $y_i \geq y_*$, the rectangles defined are not maximal. The staircase steps in this third interval (where $y_i > y_*$) are not popped from the stack (the staircase data structure), because they are not maximal. These stay on the stack. Conveniently, the steps from the first and second interval (while $y_i < y_*$) which are popped off the stack are not needed to construct the next iteration of the staircase data structure for the next entry in the matrix to be considered. The steps in these first two intervals which are popped in extracting the maximal rectangles from the staircase data structure, are the same as the steps that are discarded when constructing staircase $(x+1, y)$ from staircase $(x, y)$. The system of the preferred embodiment takes advantage of the fact that the extortion of the maximal rectangles from the staircase data structure is also the step carried out in building the new staircase which provides an efficient process as the next step after outputting the maximal steps in showcase $(x, y)$ is to construct staircase $(x+1, y)$ from staircase $(x, y)$.

The basis for ignoring the step entries for the first two potential intervals in the staircase data structure, once they are popped, is that the value $y_*$ that is used to determine which steps in staircase $(x, y)$ are maximal, and the value $y_r$ used in the construction of staircase $(x+1, y)$ are both the Y-coordinate of the top most 0-entry in the block of 0-entries in column $x+1$ starting at entry $(x+1, y)$ and extending up. In other words, for $y_*$ associated with $(x, y)$ and for $y_r$ for $(x+1, y)$, it is true that $y_* = y_r$. It follows that where staircase $(x+1, y)$ is being defined, the steps $(x_i, y_i)$ in staircase $(x, y)$ are popped and deleted as long as $y_i < y_*$ since $y_* = y_r$.

As indicated, in the system of the preferred embodiment, for each 0-value entry $(x, y)$ in the matrix a staircase $(x, y)$ is defined, and the steps in the staircase that define maximal empty rectangles are determined. To construct staircase $(x, y)$, the value $y_r$ was determined and to determine which steps are maximal, the values $x_*$ and $y_*$ are used. To distinguish between these values for different $(x, y)$, it is convenient to refer to these values as $y_r(x, y)$, $x_*(x, y)$ and $y_*(x, y)$. The system of the preferred embodiment takes advantage of the fact that there are relationships between these values. As was shown above, $y_r(x+1, y) = y_*(x, y)$.

In addition, $x_*(x, y)$ can be computed in constant time from $x_*(x-1, y)$ and $y_*(x, y)$ can be computed similarly from $y_*(x, y-1)$. In the system of the preferred embodiment, the values $x_*(x-1, y)$ and $y_*(x, y-1)$ are computed in earlier iterations and are saved at that point. All previous $x_*$ and $y_*$ values, however, are not saved in the preferred embodiment, only the $x_*$ from the previous iteration (row $y-1$) and the $y_*$ from each entry in the previous row of iterations (for each entry in row $y-1$).

The computation of $x_*(x, y)$ from $x_*(x-1, y)$ is accomplished by a method which relies on the fact that $x_*(x, y)$ is the X-coordinate of the leftmost 0-entry in the block of 0-entries in row $y+1$ starting at entry $(x, y+1)$ and extending to the left. The same fact is true about $x_*(x-1, y)$ except that the relevant block is the one extending to the left of $(x-1, y+1)$. Therefore, if entry $(x, y+1)$ contains a 0, then $x_*(x, y) = x_*(x-1, y)$. On the other hand, if entry $(x, y+1)$ contains a 1, then $x_*(x, y)$ is not well defined, as there is no leftmost 0 in the relevant block. In the preferred embodiment the value of $x_*(x, y)$ can be set to either $x+1$ or to $\infty$. Computing $y_*(x, y)$ from $y_*(x, y-1)$ is carried out in a similar manner.

In the system of the preferred embodiment, each $(x, y)$ iteration creates at most one new step and then only if the $(x, y)$ entry is 0. The total number of steps created is therefore at most the number of 0-entries in the matrix. As well, because each of these steps is popped at most once in its life and output as a maximal 0-rectangle at most once, the total number of times a step is popped and the total number of maximal 0-rectangles are both at most the number of 0-entries in the matrix. It follows that the entire computation requires only $O(nm)$ time (where $n=|X|$ and $m=|Y|$).

The system of the preferred embodiment requires only a single pass through the matrix. Other than the current $(x, y)$ entry of the matrix, only $O(\min(n,m))$ additional memory is required. The stack for staircase $(x, y)$ contains neither mom steps than the number of rows nor more than the number of columns. Hence, staircase $(x, y) = O(\min(n,m))$. The previous value for x requires $O(1)$ space. The previous row of y values requires $O(n)$ space, but the matrix can be transposed so that there are fewer rows than columns.

The description of the preferred embodiment set out above relates to the determination of a set of maximal empty rectangles in a binary matrix. The determination of empty rectangles in a binary mat has different applications for data processing. A significant application is where large relational data tables are subject to the relational join operation. Where data tables are joined over two attributes, the existence of empty rectangles in the matrix representation of tuples comprising the data values of the two attributes of the tables is useful in optimising join operations on the data tables.

Once empty rectangles for a matrix are determined, it is possible to model the empty rectangles as materialized views in a relational database management system (RDBMS) such as DB2™. The only extra storage required by such a materialized view corresponding to an empty rectangle is the storage required for the view definition since by definition, the view's extent will be empty. The following example SQL query illustrates how such a materialized view may be defined. The query is any SELECT-FROM-WHERE query with two projected Attributes X and Y:

select X, Y
from $R_1, \ldots, R_n$
where Cond(Q)

To determine an empty materialized view it is necessary to process the result of this query to determine empty regions in the matrix representing the result of the join query. If the method of the preferred embodiment is used and it is determined that the region $(x_0 \leq X \leq x_1, y_0 \leq Y \leq y_1)$ is empty then this region is represented using the following view.

create view empty as
select *
from $R_1, \ldots, R_n$
where Cond(Q) and X between $x_0$ and $x_1$
and Y between $y_0$ and $y_1$ The entire set of maximal empty rectangles determined by the above method may be represented by empty materialized views, as set out in the previous example. In practice, however, it is typically advantageous to retain only a subset of the maximal empty rectangles determined for a given matrix. The preferred embodiment retains those maximal empty rectangles that contain regions corresponding to frequently made queries. Alternatively, it is possible to retain only the largest N rectangles. N is selected so as to maintain all rectangles large enough to provide significant optimization. Such an approach may also prevent the preferred embodiment from being adversely affected by complex, overlapping maximal rectangles.

It is known to those skilled in the art to use materialized views to optimise relational queries (see for example D.

Srivastava, S. Dar, H. V Jagadish, and A. Levy. Answering queries with aggregation using views. In *Proc. Of VLDB*, 1996). In the prior art the materialized view is of value because it contains data which need not be redefined by a later query. In the system of the preferred embodiment, the empty materialized view is of value for the reason that it contains no data and later queries can be optimised by using the fact that the materialized view is empty.

An example of how empty materialized views may be used to rewrite queries to be more efficient is given with the following example:
Q1: select RegNum
from Tickets
where Date>DATE ('1999-001-01') and Amt>500

In this example, the data resulting from the following query has been subject to the empty rectangle detection method set out above and it has been detected that there are no tickets over $400 issued before Apr. $15^{th}$, 1996.
Q2: select Date, Amt
from Tickets This information is represented in the following view.
V1: create view empty as
select *
from Tickets
where Amt$\geq$400 and Date$\leq$DATE('1996-04-15')

Using a rewrite algorithm such as that described in Srivastava, above, and known to those skilled in the art, the preferred embodiment rewrites Q1 as Q3 which uses V1:
Q3: select RegNum
from Tickets
where Date$\geq$DATE('1996-04-15') and Amt>500

This approach uses the empty regions to reduce the ranges of the attributes in the query predicates. In this example, the query involved two selections over a single table. By using knowledge of empty regions, different access plans to the relation may be chosen by the optimizer (perhaps an index on Date rather than an index on Amt). If however, Amt and Date came from different relations, the optimization provided by the rewrites may be more dramatic. These optimizations may significantly reduce the cost of computing the join.

A pair of range predicates in a query can be represented as a rectangle in a two dimensional matrix. Since the goal of the rewrite is to "remove" (that is, not to reference) the combination of ranges covered by any empty rectangles, it is necessary to represent the nonempty portion of the query (referred to, for example, as the remainder query in S. Dar, M. Franklin, B. Jonsson, D. Srivastava, and M. Tan. Semantic data caching and replacement. In *Proc. Of 22nd VLDB*, pages 330–341, 1996).

Examples of the potential overlap of empty rectangles and query result rectangles is shown in FIG. 3. Example query rectangle 30 is shown in each of FIGS. 3a to 3e. Example empty rectangles are shown as shaded portions 32, 34, 36, 38, 40 in FIGS. 3a, 3b, 3c, 3d, and 3e, respectively. The configurations shown in FIG. 3 illustrate the different overlap patterns possible between an empty rectangle and the query rectangle. Where the query rectangle is a complete subset of the empty rectangle, the optimisation is trivial as the query will return no results.

Figure 3A:
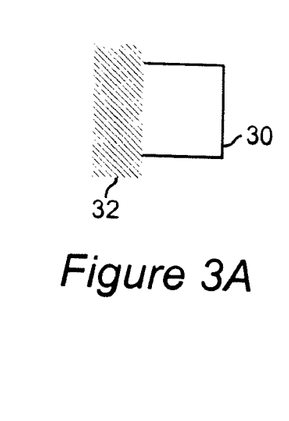
FIG. 3 is a block diagram showing examples of overlap between queries and empty rectangles as defined by the preferred embodiment of the invention.
Figure 3B:
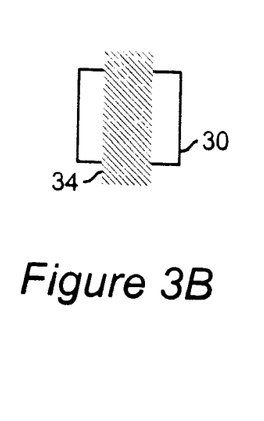
Figure 3C:
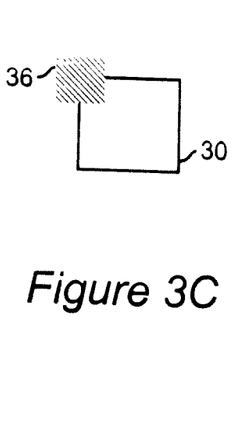
Figure 3D:
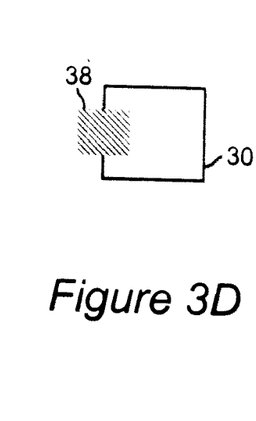
Figure 3E:
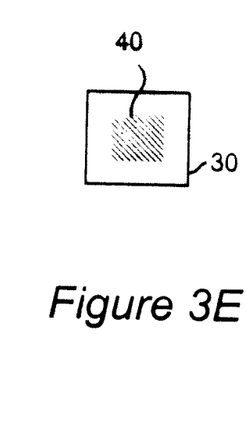

Using rewrites containing multiple non-empty query blocks may degrade rather than improve query performance. Thus, in the preferred embodiment, the decision about which empty rectangles to use in a rewrite is made within the optimizer in a cost-based way. There are cases, however, when cost-based optimization can be avoided. For example, a rewrite where the relationship between the query rectangle and a defined empty rectangle is shown as in FIG. 3a is guaranteed not to produce worse performance than in the original query, provided this rewrite can be found efficiently. For the other examples in FIG. 3, the remainder query is represented by a number of query rectangles and an appropriate optimisation may be more difficult to determine.

As will be apparent to those skilled in the art, determining maximal empty rectangles will have significance for relational operation optimisation, as described above. In addition, the invention will be applicable in other data processing fields where data characterization is required.

Although a preferred embodiment of the present invention has been described here in detail, it will be appreciated by those skilled in the art, that variations may be made thereto, without departing from the spirit of the invention or the scope of the appended claims.

The embodiments of the invention in which an exclusive property or privilege is claimed are defined as follows:

1. A method for determining maximal homogeneous target-value rectangles for a binary matrix, the method comprising the steps of:
sequentially selecting each entry (x, y) from row y and column x in the matrix, the sequence for selection being ordered first by lowest row to highest row, and within each row from lowest column to highest column,
for each selected entry (x, y),
determining the entries in a staircase (x, y) data structure, the staircase (x, y) data structure comprising entries corresponding to entries in the matrix, each entry in the staircase (x, y) data structure corresponding to a step in a staircase-shaped region of the matrix having target-value entries only, the staircase-shaped region having a first boundary defined by column x and having a second boundary defined by row y,
extracting maximal rectangles for entry (x, y) by removing from the staircase (x, y) data structure, and storing as part of a set of maximal homogeneous rectangles for the matrix, each entry in the staircase (x, y) data structure corresponding to a maximal rectangle of target-values, where the said rectangle is characterized by a corner with the highest x column value and highest y row value being entry (x, y).

2. The method of claim 1 in which the step of extracting maximal rectangles comprises the following steps:
a) determining a value $x_*$ for the entry (x, y),
the value $x_*$ being defined to be the column at the low X-value end of a block of target-value entries in row y+1 commencing at entry (x, y+1), the value $x_*$ being defined to be an arbitrarily high value greater than x, where there is no such block of target-value entries,
b) determining a value $y_*$ for the entry (x, y),
the value $y_*$ being defined to be the row at the low Y-value end of a block of target-value entries in column x+1, commencing at entry (x+1, y), the value $y_*$ being defined to be an arbitrarily high value greater than y, where there is no such block of target-value entries,
c) extracting as maximal rectangles those entries $(x_i, y_i)$ in staircase (x, y) for which both $x_i<x_*$ and $y_i<y_*$.

3. The method of claim 1 in which the staircase (x, y) data structure is maintained as a stack.

4. The method of claim 1 in which the step of determining the entries in a staircase (x, y) data structure comprises the step of determining the said entries by utilizing the entries in a staircase (x−1, y) data structure, following the extraction of maximal rectangle entries from the staircase (x−1, y) data structure.

5. The method of claim 2 in which the steps of determining a value $x_*$ and a value $y_*$ for an entry (x, y) comprise the steps of accessing stored values for a value $x_*$ and a value $y_*$ for the selected entry (x−1, y) and accessing values for entries (x, y−1) and (x−1, y) to determine the values for $x_*$ and $y_*$ for the entry (x, y).

6. A computer system for determining maximal homogeneous target-value rectangles for a binary matrix, the system outputting maximal rectangles for each entry (x, y) in the matrix, the entries being considered in row order from smallest to largest and in column order from smallest to largest within each row, the system reading row y+1 from the binary matrix before determining the maximal rectangles for the entry (x, y), the system maintaining a staircase data structure for storing staircase and modified staircase values for entries in the matrix, the system storing a defined $x_*$ value for each row and storing a defined $y_*$ value for each entry in a row, the system comprising, i) means for determining, in the staircase data structure, a set of staircase values for the entry (x, y) in the staircase data structure, the means comprising, (a) means for setting staircase values in the staircase data structure to null if the entry (x, y) is not a target-value entry, (b) means for building the staircase data structure if the entry (x, y) is a target-value entry, comprising, means for defining a value $x_*$ and a value $y_*$ for entry (x, y)

where the value $x_*$ is defined to be the column at the low X-value end of a block of 0-entries in row y+1 commencing at entry (x, y+1), the value $x_*$ being defined to be an arbitrarily high value greater than x, where there is no such block of target-value entries and the value $y_*$ is defined to be the row at the low Y-value end of a block of 0-entries in column x+1, commencing at entry (x+1, y), the value $y_*$ being defined to be an arbitrarily high value greater than y, where there is no such block of target-value entries and means for defining the staircase values for entry (x, y) by adding a new step to a defined set of modified staircase values for an entry (x−1, y), the new step having the value pair $x_n$ and $y_r$, where if entry (x−1, y) is a 0-entry then $y_r$ is defined to be the stored $y_*$ value for the entry (x−1, y) and otherwise $y_r$ is defined to be an infinite value, and where $x_n$ is defined by comparing $y_r$ to the Y-value of the highest step of staircase values for entry (x−1, y), ii) means for retrieving maximal rectangles for entry (x, y) from a non-null set of staircase values for entry (x, y) by removing all steps from the staircase data structure for the staircase values for entry (x, y) where the y value of the step is less than the y* value for entry (x, y) and the x value of the step is less than the x* value for entry (x, y), iii) means for defining the remaining staircase values for the entry (x, y) in the staircase data structure to be the defined set of modified staircase values for the entry (x, y), and c) means for updating the stored value for $x_*$ for row y, and means for updating the stored value for $y_*$ for each of the entries in row y.

7. A program storage device readable by a machine, tangibly embodying a program of instructions executable by the machine to perform method steps for determining maximal homogeneous target-value rectangles for a binary matrix, the method steps comprising the following steps:

a) outputting maximal rectangles for each entry (x, y) in the matrix, the entries being considered in row order from smallest to largest and in column order from smallest to largest within each row, b) reading row y+1 from the binary matrix before determining the maximal rectangles for the entry (x, y), c) maintaining a staircase data structure for storing staircase and modified staircase values for entries in the matrix, d) storing a defined x* value for each row and storing a defined y* value for each entry in a row, e) determining, in the staircase data structure, a set of staircase values for the entry (it, y) in the staircase data structure, the step comprising i) setting staircase values in the staircase data structure to null if the entry (x, y) is not a target-value entry, ii) building the staircase data structure if the entry (x, y) is a target-value entry, the step comprising the steps of defining a value $x_*$ and a value $y_*$ for entry (x,y) where value $x_*$ is defined to be the column at the low X-value end of a block of 0-entries in row y+1 commencing at entry (x, y+1), the value $x_*$ being defined to be an arbitrarily high value greater than x, where there is no such block of target-value entries and the value $y_*$ is defined to be the row at the low Y-value end of a block of 0-entries in column x+1, commencing at entry (x+1, y), the value $y_*$ being defined to be an arbitrarily high value greater than y, where there is no such block of target-value entries and defining the staircase values for entry (x, y) by adding a new step to a defined set of modified staircase values for an entry (x+1, y), the new step having the value pair $x_n$ and $y_r$, where if entry (x+1, y) is a 0-entry then $y_r$ is defined to be the stored $y_*$ value for the entry (x−1, y) and otherwise $Y_r$ is defined to be an infinite value, and where $x_n$ is defined by comparing $Y_r$ to the Y-value of the highest step of staircase values for entry (x−1, y), f) retrieving maximal rectangles for entry (x, y) from a non-null set of staircase values for entry (x, y) by removing all steps from the staircase data structure for the staircase values for entry (x, y) where the y value of the step is less than the $y_*$ value for entry (x,y) and the x value of the step is less than the $x_*$ same for entry (x, y), g) defining the remaining staircase values for the entry (x, y) in the staircase data structure to be the defined set of modified staircase values for the entry (x, y), and h) updating the stored value for $x_*$ for row y, and updating the stored value for y* for each of the entries in row y.

8. A method for defining efficient relational join operations on a first relational table and a second relational table, the method comprising the steps of:
- a) carrying out a first join on the first relational table and the second relational table, relative to a first attribute in the first relational table and a second attribute in the second relational table,
- b) defining a binary matrix representing the result of the first join, the matrix having rows corresponding to the first attribute data space and columns corresponding to the second attribute data space, an entry (x, y) in the matrix being defined to be empty where there is no tuple with values x and y, where x and y refer to the values of the two attributes, respectively, in the join of the first relational table and the second relational table,
- c) mining the binary matrix to define maximal empty rectangles,
- d) using the mined maximal empty rectangles to optimize later queries on the join of the first relational table and the second relational table where the query predicates are dependent on the first attribute and the second attribute.

9. The method of claim 8 in which the step of mining the binary matrix to define empty rectangles comprises the steps:

sequentially selecting each entry (x, y) from row y and column x in the matrix, the sequence for selection being ordered first by lowest row to highest row, and within each row from lowest column to highest column, for each selected entry (x, y), determining the entries in a staircase (x, y) data structure, the staircase (x, y) data structure comprising entries corresponding to entries in the matrix, each entry in the staircase (x, y) data structure corresponding to a step in a staircase-shaped region of the matrix having target-value entries only, the staircase-shaped region having a one of boundaries defined by column x and having another one of boundaries defined by row y, extracting maximal rectangles for entry (x, y) by removing from the staircase (x, y) data structure, and storing as part of a set of maximal homogeneous rectangles for the matrix, each entry in the staircase (x, y) data structure corresponding to a maximal rectangle of target-values, where the said rectangle is characterized by a corner with the highest x column value and highest y row value being entry (x, y).

10. The method of claim 9 comprising the further step of representing a selected sub-set of the mined maximal empty rectangles as materialized empty views and optimizing later queries by reducing ranges of attributes in the query predicates, based on the materialized empty views.

* * * * *